Aug. 28, 1962  A. KURIS ET AL  3,051,027
ULTRASONIC WELDING
Filed Nov. 16, 1959

INVENTORS
ARTHUR KURIS, LEWIS BALAMUTH
AND CLAUS KLEESATTEL
BY
ATTORNEY

# United States Patent Office 3,051,027
Patented Aug. 28, 1962

3,051,027
ULTRASONIC WELDING
Arthur Kuris, Riverdale, Lewis Balamuth, Woodside, and Claus Kleesattel, Forest Hills, N.Y., assignors to Cavitron Ultrasonics Inc., New York, N.Y., a corporation of New York
Filed Nov. 16, 1959, Ser. No. 853,172
5 Claims. (Cl. 78—82)

This invention relates generally to ultrasonic welding, and more particularly is directed to the provision of improved tools for effecting the ultrasonic welding of extremely small, or even microspic elements.

Ultrasonic welding of metals generally is known and is essentially a solid state bonding process carried out at ambient temperature, without the aid of solders or fluxes. In existing ultrasonic welding devices, the metals to be joined are placed between two welding tips or sonotrodes, representing a driving sonotrode and a reflecting sonotrode or acoustically dead base, respectively, and are clamped under a static pressure while ultrasonic energy is introduced through the driving sonotrode for a relatively short interval. This arrangement introduces elastic vibratory energy into the joint area with the result that a weld or bond is there formed between the metals. However, the existing ultrasonic welding devices are not adapted for the welding of extremely minute or even microscopic elements, since such existing devices are not designed to overcome those problems peculiar to the application of ultrasonic welding to the general field of the fabrication of extremely minute elements. By way of illustrating the general field to which ultrasonic welding is to be applied in accordance with the present invention, it may be mentioned that single pieces of semiconductor material measuring less than ¼ inch by ⅛ inch by ½₂ inch have been formed into complete electronic circuits containing the equivalent of twelve separate components, namely, two transistors, two capacitors, and eight resistors. In manufacturing such minute, and yet complete electronic circuits, it is necessary to attach very fine wire leads, frequently having diameters of less than .002 inch and being barely visible to the naked eye, to extremely small metal terminals or spots fired on the surface of the semi-conductor wafer.

In the ultrasonic welding of minute elements of the kind mentioned above, it is necessary that there be a very small area of contact of the vibrated sonotrode or welding tip with one of the elements to be welded so that the acoustic or elastic vibratory energy is introduced into the desired joint area. However, if the vibrated welding tip is merely given small dimensions in order to provide the desired small area of contact at the joint area, the mass of that welding tip is correspondingly small, and the ultrasonic vibrations applied to the welding tip may be damped by the pressure with which the welding tip is held against the joint area.

Accordingly, it is an object of the present invention to provide welding tips of substantial mass and small areas of contact particularly suited for the ultrasonic welding of extremely minute, or even microscopic elements.

Another object is to provide ultrasonic welding devices having the above mentioned capabilities, and which are particularly adapted to be hand operated, or to be embodied in automated machinery.

A further object is to provide welding tips which are particularly adapted for the ultrasonic welding of extremely minute elements, and which are interchangeable with other work tools in acoustically vibrated material treating devices of the type disclosed in the co-pending application for United States Letters Patent, Serial No. 758,069, filed August 29, 1958, by Lewis Balamuth, Arthur Kuris and Claus Kleesattel, and wherein each welding tip is rigidly joined, in end to end relationship, to a connecting body or acoustic impedance transformer and to a transducer to form an insert unit or assembly which is removably supported in a housing containing a coil in surrounding relationship to the transducer and receiving a biased alternating current for producing an alternating electromagnetic field.

In accordance with an aspect of this invention, extremely minute elements may be ultrasonically welded between a base, which is preferably acoustically dead, and a welding tip which presses the elements against the base while ultrasonic energy is introduced through the welding tip at a suitable frequency and amplitude to cause welding together of the elements, the welding tip being formed by a relatively massive body with one or more projections having small dimensions extending therefrom to provide the desired small area of contact with the elements.

In accordance with another aspect of the invention, the welding tip is formed as a fixedly secured part of an insert unit or assembly which further includes a transducer, a connecting body or transformer and means to removably support the unit in a housing containing an excitation coil for establishing the alternating electromagnetic field by which the transducer is induced to vibrate at a relatively high frequency and small amplitude. Thus, each insert unit having a welding tip as a permanent part thereof is conveniently interchangeable with other insert units having either different types of welding tips or other work tools.

The above, and other objects, features and advantages of the invention, will be apparent in the following detailed description of illustrative embodiments of the invention which is to be read in connection with the accompanying drawing forming a part hereof, and wherein.

Figure 1:
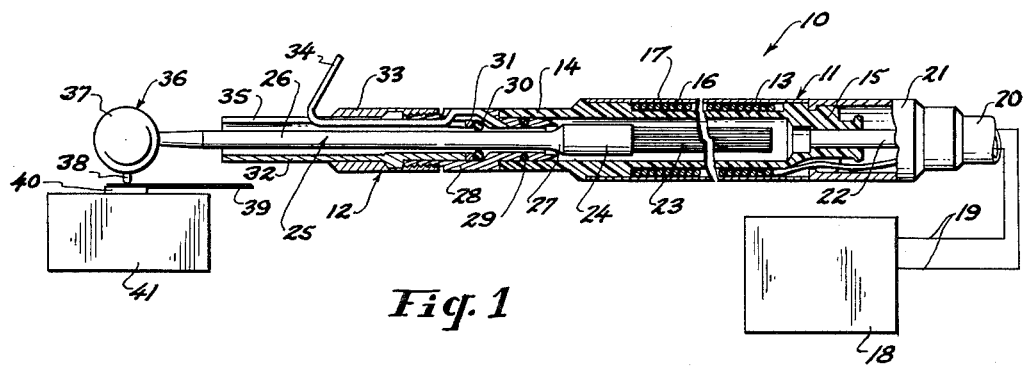
FIG. 1 is a side elevational view, partly broken away and an axial section, of an ultrasonic welding device embodying the present invention.

Referring to the drawing in detail, and initially to FIG. 1 thereof, it will be seen that an ultrasonic welding device embodying the present invention, and there generally identified by the reference numeral 10, may be in the form of a hand piece which generally comprises a tubular housing 11 into which a welding tip supporting insert unit 12 may be partially telescoped.

The housing 11, as in our above identified, prior filed application, Serial No. 758,069, includes a tubular casing 13 preferably formed of molded plastic, such as, nylon or the like, and having an inner wall surface which is relatively smooth and of uniform diameter throughout. The casing 13 has an extension 14, at one end, through which insert unit 12 can extend into the casing, while the other, or tail end of casing 13 terminates in a nipple portion 15. A winding 16 of current conducting wire, such as, copper or the like, which is protected by an enamel coating is wound on the outside of tubular casing 13 and is enclosed and protected by an outer jacket 17 which may be formed of extruded plastic tubing. The plastic material of casing 13 does not impede the establishment of an alternating electromagnetic field within the tubular casing upon excitation of the exterior winding or coil 16. The biased alternating current for exciting winding 16 is supplied to the latter from a suitable generator 18 by way of wire leads 19 which are housed in a protective flexible conduit 20 connected to the nipple portion 15 of casing 13 by an adaptor 21. Conduit 20 also contains a tube 22 by which a coolant may be supplied through nipple portion 15 to the interior of tubular casing 13.

The insert unit 12 is made up of a mechanical vibrator that includes a transducer 23 designed to be telescoped within tubular casing 13 with winding 16 in surrounding relation thereto. The transducer 23 may be any one of a number of electromechanical types, such as, electrodynamic, piezo-electric or magnetostrictive, however, for the operating range of frequencies most desirable for ultrasonic welding of minute elements, transducer 23 is preferably of the magnetostrictive type. The magnetostrictive transducer 23 is preferably formed of a metal, such as, permanickel, nickel, permendur, or other metals which have high tensile strength and are highly magnetostrictive in character, so that it will vibrate to a maximum degree when subjected to the influence of the alternating electromagnetic field established by the biased alternating current supplied to winding 16.

In the embodiment shown in FIG. 1, transducer 23 comprises a stack of strips of the selected metal secured together at one end, while the other end of the transducer is rigidly fixed, as by brazing solder, to a head 24 of an acoustic impedance transformer generally identified by the reference numeral 25 and also forming part of the mechanical vibrator.

In place of the stack of metal strips forming the transducer 23 in the illustrated embodiment of the invention, there may be substituted a bundle of metal wires or rods, preferably of rectangular cross-section so that they can be compactly assembled together, a roll of metal foil, or a longitudinally split hollow metal tube. In any case, the length of the magnetostrictive transducer 23 is selected so that it will be a half wave length, or multiples thereof, at the frequency of the alternating electromagnetic field established within tubular casing 13 by winding 16.

The acoustic impedance transformer or connecting body 25 may be made of a strong metal, such as, steel, monel metal, titanium, phosphor-bronze, brass or beryllium copper, and further includes a stem 26 integrally joined to the head 24 by a tapered neck 27. The length of stem 26 is sufficient so that it will project out of housing 11 when insert unit 12 is assembled to housing 11 with transducer 23 telescoped within casing 13.

In the embodiment of the invention illustrated in FIG. 1, the removable insert unit 12 further includes a tubular retainer 28 extending loosely around stem 26 and having a reduced diameter neck dimensioned to telescope snugly into extension 14 of casing 13, and to abut, at its edge, against tapered neck 27. A resilient O-ring 29 is set within a groove extending around the reduced neck of retainer 28, and provides a liquid seal between the neck and extension 14.

A second resilient O-ring 30 fits snugly around stem 26 of transformer 25 and is driven axially into abutment against an internal shoulder of tubular retainer 28 by a metal ring 31 which fits loosely over the transformer stem 26. The portion of stem 26 extending beyond retainer 28 may be protected by a guard member 32 having a throat telescoping snugly into retainer 28 and thus supported by the latter. The protective guard member 32 is held in assembled relation to retainer 28 by means of a sleeve 33 engaging an external shoulder 34 on guard member 32 and having a threaded connection with retainer 28 so that, when sleeve 33 is tightened on retainer 28, guard member 32 is drawn axially into retainer 28 and acts, at its inner edge, against metal ring 31 which is, in turn, pressed against resilient O-ring 30 to radially expand the latter. The expanded O-ring 30 provides a fluid seal between stem 26 and the bore of retainer 28, and additionally provides the sole support for the mechanical vibrator formed by transformer 25 and transducer 23 at approximately a node of movement thereof so that the vibrations of high frequency and low amplitude are not dampened or transmitted to the housing.

It will be apparent that the entire insert unit 12 may be disconnected from housing 11 by merely exerting an outward pull thereon sufficient to withdraw the reduced neck and associated O-ring 29 of retainer 28 from extension 14 of casing 13. The entire insert unit 12 may likewise be attached to the housing 11 in a leak-proof manner merely by telescoping the reduced neck and O-ring 29 of retainer 28 into extension 14. Thus, interchangeable insert units constructed in the above described manner and equipped with welding tips of different kinds and shapes, as hereinafter described in detail, can be quickly applied and removed from the housing 11 as desired.

Since the transducer 23 is subjected to heating after prolonged operation and most effectively serves its purpose when maintained in relatively cool condition, the flow of cooling fluid, such as, water or cold air, from tube 22 is directed into the interior of casing 13 containing the transducer, and such flow of cooling fluid also maintains the outer jacket 13 at approximately room temperature so that it can be comfortably grasped. The cooling fluid supplied to the interior of casing 13 is permitted to bleed into the bore of retainer 28 through one or more notches (not shown) in the edge of the reduced diameter neck of the retainer, and is discharged from the bore of retainer 28 through a bent tube 34 which bypasses rings 30 and 31 and then extends outwardly through a longitudinal slot 35 in guard member 32. The discharge tube 34 may be connected to flexible tubing (not shown) for carrying the discharged cooling fluid away from the welding area.

The insert unit 12 further includes a welding tip 36 connected to the output end of the acoustic impedance transformer to be vibrated by the latter. Although the welding tip 36 is shown permanently attached to the output end of transformer 25, as by brazing solder, and such permanent attachment is preferable in order to achieve the full advantages of the removable characteristic of insert unit 12, it is to be noted that the welding tip may be in the form of a separable element removably attached to transformer 25, for example, by a threaded connection.

In accordance with the present invention, the welding tip includes a body of relatively great mass attached to the transformer, and one or more projections extending from that body and each having small dimensions to define a minute area of contact of the welding tip with elements to be welded.

In the embodiment of FIG. 1, the welding tip 36 has a relatively massive body 37 in the form of a solid metal sphere having its center lying on the longitudinal axis of transformer 25, and a projection 38 having relatively small dimensions is attached to the surface of sphere 37, for example, by brazing solder, at a location on such surface of the sphere at the outer end of a radius of the latter extending perpendicular to the axis of transformer 25.

The outer or free end of projection 38 is formed with a very small radius of curvature so that, when elements to be welded, for example, a very fine wire 39 and a thin metal foil plate 40, are disposed between projection 38 and a block 41 of metal or other material having sufficient mass so as to be acoustically dead, the area of contact of projection 38 with one of the elements 39 and 40 will be very small.

Although welding tip 36 is shown with only one projection 38 on sphere 37, it is to be understood that the sphere may be provided with a second projection at a location diametrically opposed to that of the illustrated projection 38.

Since welding tip 36 forms an extension of transformer 25, that welding tip should be taken into consideration in determining the length of the transformer which has to correspond to one-half wave length, or multiples thereof, at the vibration frequency of transducer 23. The welding tip 36 is preferably disposed at a longitudinal loop of motion, while a node of motion of transformer 25 is in the area adjacent to resilient ring 30 by which the integral assembly of transducer 23, transformer 25 and welding tip 36 is exclusively supported. With welding tip 36 being substantially symmetrical about the axis of transformer 25, as is the case with welding tip 36 in which the mass of the asymmetrical single projection 38 may be ignored in relation to the relatively great mass of spherical body 37, and being disposed at a longitudinal loop of motion, a vibrational stroke is established at the end of projection 38 in a direction substantially parallel to the longitudinal axis of transformer 25.

When the two metal elements 39 and 40 to be welded to each other are placed between projection 38 of welding tip 36 and a surface of block or base 41 and held in contact with each other by the pressing of welding tip 36 toward block 41 with the welding device 10 held so that the longitudinal axis of transformer 25 is substantially parallel to the plane of the top surface of block 41, the vibrational stroke at the end of projection 38 of tip 36 in contact with one of the elements to be welded introduces elastic vibratory energy into the joint at the very small area of contact and, when the introduced energy is sufficiently high, a strong welded joint is formed. However, it has been found that, particularly in welding extremely minute elements, certain limitations must be observed with respect to the amplitude and frequency of the vibratory energy. Specifically, the vibratory stroke must be less than the minimum dimension of the smaller of the two elements being welded to each other, and is preferably one-tenth or less than such minimum dimension. Having in mind the foregoing limitation with respect to the vibratory stroke, it is apparent that the operating frequency must be suitably selected so as to obtain the introduction of sufficient elastic vibratory energy for establishing welding conditions at the joint area. It has been found that, if the minimum dimension of the elements to be welded is larger than .002 inch, an operating frequency range in the order of 20,000 to about 30,000 cycles per second will be sufficient to effect the necessary weld. However, if the minimum dimension is less than .002 inch, an operating frequency range between 60,000 and about 80,000 cycles per second is preferred.

The amplitude of the vibratory movement imparted to projection 38 of welding tip 36 may be held to the desired limits by suitably designing and proportioning acoustic impedance transformer 25. Thus, transformer 25 can be designed to magnify the amplitude of the vibrations delivered thereto by transducer 23 or to decrease the amplitude of the vibration of welding tip 36 to a value lower than the amplitude at the end of transformer 25 attached to transducer 23. When the transformer has a larger cross-sectional area at the end to which the transducer is attached than at the end to which the welding tip is attached, as in FIG. 1, the amplitude of the vibrations delivered to welding tip 36 is correspondingly amplified or increased, and, conversely, when the transducer attached end of transformer 25 has a smaller cross-sectional area than the opposite end thereof, the amplitude of vibration of welding tip 36 has a correspondingly smaller value than the amplitude of vibrations received from transducer 23. Thus, by a proper proportioning of the cross-sectional areas of the vibration receiving end and vibration delivering end of transformer 25, the attached welding tip 36 may be given a wide range of vibratory strokes at the frequency of vibration of transducer 23.

With welding tip 36 disposed approximately at a longitudinal loop of motion of transformer stem 26, and with the elements 39 and 40 which are to be welded being held between projection 38 of tip 36 and the flat top surface of the base or block 41 which is preferably acoustically dead so as to avoid any sympathetic movement thereof with the welding tip, it will be apparent that the movement of projection 38 in the direction parallel to the top surface of block 41 will cause relative movement between the welding tip and the elements 39 and 40 and also between the latter, and such relative movement will be accompanied by frictional heating serving to produce the desired welding action in the joint area defined by the small area of contact of projection 38 with the elements. In order to avoid welding of the tip 36 to the elements to be welded, it is necessary that the welding tip, or at least the projection 38 thereof, be made of a metal having a higher melting point than the melting points of the metals forming the elements to be welded. Further, it is preferable that the welding tip be of a metal which is non-wettable by the metals of the elements to be welded, thereby to avoid adhesion of the latter to the welding tip upon cooling of the melted weld metal.

Figure 2:
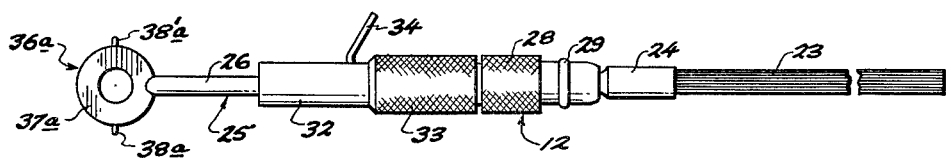
FIG. 2 is a side elevational view of a removable insert unit similar to that included in the device of FIG. 1, but including a welding tip formed in accordance with another embodiment of the invention.

Referring to FIG. 2, it will be seen that, in another embodiment of the invention, the welding tip 36a is formed of a relatively massive, flat, ring-like body 37a which is preferably permanently attached, as by brazing solder, to the output end of stem 26 of transformer 25, with ring-like body 37a being located so that the longitudinal axis of the transformer extends diametrically thereacross and the ring-like body is thus symmetrical with respect to such longitudinal axis. Projections 38a and 38′a having relatively small dimensions are secured, as by brazing solder, to the periphery of ring-like body 37a at locations lying at the opposite ends of a diameter of that body extending perpendicular to the longitudinal axis of transformer 25.

The ring-like body 37a of welding tip 36a is also located at a longitudinal loop of motion of transformer 25 so that the elastic vibratory energy transmitted by transformer 25 produces vibratory movement of projections 38a and 38′a in directions parallel to the axis of transformer 25. The projections 38a and 38′a have ends with small radii of curvature to define small areas of contact with the elements to be welded in the same manner as described above with reference to welding tip 36 of FIG. 1.

Figure 3:
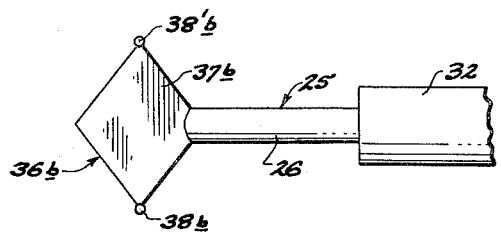
FIG. 3 is a fragmentary side elevational view of a removable insert unit having a welding tip in accordance with still another embodiment of the invention.

In the embodiment of the invention illustrated in FIG. 3, the welding tip 36b includes a flat, quadrilateral plate 37b having equal angles at its opposite corners and which is preferably permanently attached, as by brazing solder, to the output end of stem 26 of transformer 25, with the longitudinal axis of the transformer being axially aligned with a diagonal of the plate 37b so that the latter is symmetrically disposed with respect to that longitudinal axis. The flat plate 37b represents the relatively massive body of welding tip 36b and, at its corners projecting laterally away from the longitudinal axis of transformer 25, the plate 37b has very small diameter spheres 38b and 38′b attached thereto, as by brazing solder, in order to define the desired small areas of contact of the welding tip.

Figure 4:
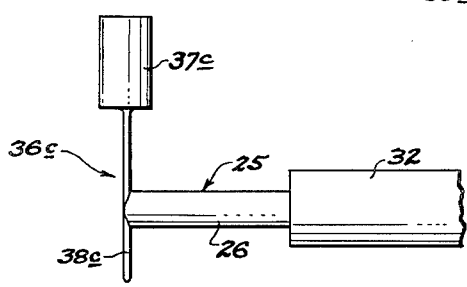
FIG. 4 is a view similar to that of FIG. 3, but illustrating still another embodiment of the invention.

In each of the embodiments of the invention described above with reference to FIGS. 1, 2 and 3, the welding tip is symmetrical, or at least substantially symmetrical, about the longitudinal axis of the transformer 25. However, as shown in FIG. 4, a welding tip 36b embodying the invention need not be symmetrical about such longitudinal axis. Thus, the welding tip 36c includes a relatively massive body 37c secured, as by brazing solder, to one end of an elongated, slender or relatively small diameter rod 38c which, at its other end, is formed with a small radius of curvature to define the desired small area of contact of the welding tip with the elements to be welded. The rod 38c is attached, as by brazing solder, to the output end of stem 26 of transformer 25 at a location intermediate the ends of rod 38c and with the latter extending substantially at right angles to the longitudinal axis of transformer 25 so that the massive body 37c lies at one side of the longitudinal axis of the transformer, while the welding end of the rod 38c lies at the other side of that longitudinal axis.

In the arrangement of FIG. 4, the welding tip 36c is also disposed at a longitudinal loop of motion of the transformer so that elastic vibratory energy transmitted by the latter will produce vibrations at the output end of stem 26, with such vibrations being in the direction of the longitudinal axis of the transformer. Such vibrations, when transmitted to rod 38c, will cause the output end of rod 38c to vibrate in a direction parallel to the longitudinal axis of transformer 25, and this effect is due, at least in part, to the eccentrically located mass 37c.

It will be apparent that, in each of the above described embodiments of the invention, the welding tip has a substantial mass, so as to avoid damping out of the vibrations when the welding tip is pressed against the elements to be welded, while providing a small area of contact of the welding tip with the elements to be welded, so that the elastic vibratory energy is introduced into such elements in a small area of contact corresponding to the desired joint area.

It is also to be noted that, while the illustrated embodiments of the invention have been described as welding tips attached to the acoustic impedance transformers of particular ultrasonic welding devices, such welding tips may be used in connection with other ultrasonic welding devices capable of supplying the necessary elastic vibratory energy to the welding tips.

Further, although illustrative embodiments of the invention have been described in detail herein with reference to the accompanying drawing, it is to be understood that the invention is not limited to those precise embodiments, and that various changes and modifications may be effected therein by one skilled in the art without departing from the scope or spirit of the invention, except as defined in the appended claims.

What is claimed is:

1. An ultrasonic welding tip for use with extremely small elements to be welded comprising a body of relatively large mass adapted to be vibrated at high frequency and low amplitude in a predetermined direction and being symmetrical about the direction of the vibrations, and at least one projection extending from said body and having relatively minute cross-sectional dimensions and an end surface with a small radius of curvature for defining a minute area of contact with elements to be welded, said projection extending at right angles to said direction of the vibration of said body so that said end surface vibrates in said direction and said mass of the body prevents damping of the vibrations of said end surface by contact of the latter with the elements to be welded.

2. An ultrasonic welding tip as in claim 1; wherein said body has a circular configuration at least in a plane containing said direction of the vibrations and said projection extends from the periphery of said circular configuration.

3. An ultrasonic welding tip as in claim 2; wherein said body is in the form of a ring.

4. An ultrasonic welding tip as in claim 2; wherein said body is in the form of a sphere.

5. An ultrasonic welding tip as in claim 1; wherein said body is in the form of a flat quadrilateral plate having equal opposite angles and arranged with one of its diagonals extending in said direction of the vibrations, and said projection extends from a corner of said plate at an end of the other diagonal of the quadrilateral plate.

References Cited in the file of this patent

UNITED STATES PATENTS

| | | |
|---|---|---|
| 2,573,168 | Mason | Oct. 30, 1951 |
| 2,632,858 | Calosi | Mar. 24, 1953 |
| 2,874,470 | Richards | Feb. 24, 1959 |
| 2,891,178 | Elmore | June 16, 1959 |
| 2,939,348 | Barnes | June 7, 1960 |
| 2,946,119 | Jones | July 26, 1960 |
| 2,985,954 | Jones | May 30, 1961 |

OTHER REFERENCES

"Ultrasonic Welding of Aluminum," Welding Journal, October 1959, pages 969–975.